United States Patent [19]
Widmer et al.

[11] 4,441,095
[45] Apr. 3, 1984

[54] CODE TRANSLATOR

[75] Inventors: Walter R. Widmer, Niederhasli; Marcel Baschong, Staufen, both of Switzerland

[73] Assignee: Gretag Aktiengesellschaft, Regensdorf, Switzerland

[21] Appl. No.: 967,580

[22] Filed: Dec. 8, 1978

[30] Foreign Application Priority Data

Dec. 16, 1977 [CH] Switzerland ............ 15514/77

[51] Int. Cl.³ .................................. G06F 3/00
[52] U.S. Cl. ....................... 340/347 DD; 364/200; 364/900
[58] Field of Search ............... 235/310, 311; 340/347 DD; 364/900, 200; 178/26 R, 26 A

[56] References Cited

PUBLICATIONS

Ling, "IBM Technical Disclosure Bulletin," vol. 15, No. 1, Jun. 1972, pp. 142–143.
Smith, "Radio-Electronics," vol. 47, No. 4, pp. 57–59, 82–83, 86, Apr. 1976.
Smith, "Radio-Electronics," vol. 47, No. 3, pp. 51–53, 58, Mar. 1976.

*Primary Examiner*—C. D. Miller
*Attorney, Agent, or Firm*—Burns, Doane, Swecker & Mathis

[57] ABSTRACT

Means for converting characters of a first 128-character alphabet (ASCII) into characters of a second 26-character alphabet are provided and convert each pair of characters of the first alphabet into three characters of the second alphabet and vice versa.

The means are embodied by a suitably programmed computer. In the conversion, each pair of characters $Z_1$, $Z_2$ of the first alphabet are interpreted as numbers and divided by 26. The resulting largest multiples $Q_1$, $Q_2$ of 26 are multiplied by 1 and 5 respectively and the products are added. The remainders after division give the first two characters $A_1$ and $A_2$ out of each set of three characters of the second alphabet, and the sum of the products gives the third character $A_3$. Reconversion is similar. First, $Q_2$ is obtained by division as the largest integral multiple of 5 in $A_3$ and $Q_1$ is the remainder after division. $Q_1$ and $Q_2$ are then each multiplied by 26 and added to $A_1$ and $A_2$, giving the sums $Z_1$ and $Z_2$.

14 Claims, 4 Drawing Figures

CODE TRANSLATOR

FIELD OF THE INVENTION

The invention relates to a cryptogram convertor for unambiguously converting characters of a first 128-character alphabet into characters of a second 26-character alphabet and vice versa.

In cryptography it is often necessary for the coded text or cryptogram to be made up entirely from the 26 letters of the ordinary alphabet. Usually, however, the plain-language text contains a set of characters which is much larger than 26, since all the upper-case letters are used together with figures, special signs and even lower-case letters if required (e.g. in the 7-bit code, International Alphabet No. 5 and ASCII). The function of a cryptogram converter is to unambiguously convert a text, which may contain all the characters in a relatively extensive set, into a text containing a more limited set of characters, more particularly only letters.

PRIOR ART

A very common method of extending or compressing the set of characters is to use transposition characters. There are two variants. The first, used mainly in telex, uses the two special characters "figures" and "letters," the set of characters being extended in the case of all those following a transposition character (figures) up to the next resetting character (letters). The second variant is particularly common in cryptography and has been used in the prior art cryptogram converters. In the second variant, a character such as "Q" from the 26-letter alphabet is reserved as a transposition character. The changeover applies only to the character immediately following the transposition character.

The first variant is relatively efficient for a normal text, i.e. when there are relatively long sequences of the first or second set of characters, but is sensitive to disturbance and unsuitable in practice for random or coded texts. In addition, the ratio of the length of the original text to the length of the converted text is dependent on the text itself. The second variant is efficient only in the relatively few cases when there is only a slight difference between the number of characters in the two sets which are to be converted into one another, i.e. transposition is required only relatively infrequently. In this variant likewise, the text-length ratio is not constant but depends on the text.

OBJECT OF THE INVENTION

An object of the invention is to provide a cryptogram converter of the initially-defined kind which is very efficient and resistant to interference and wherein the text-length ratio is not dependent on the text being converted.

SUMMARY OF THE INVENTION

To this end, the invention provides a cryptogram converter characterised by means which convert each pair of characters of the first alphabet into three characters of the second alphabet and vice versa.

Accordingly, the cryptogram converter according to the invention converts each pair of characters, e.g. of the ASCII code, into three letters and vice versa.

In theory, each pair of characters from the 128-character alphabet can be associated with a given set of three characters from the 26-alphabet, e.g. by using an electronic table embodied by a store. However, owing to the very large number of possible combinations of characters (128×128), the table will need to be very extensive, and is thus unsuitable in practice. The cryptogram converter described herein includes means by which three characters from the second alphabet are newly derived in each case from two characters of the first alphabet and vice versa, on the basis of given laws.

BRIEF DESCRIPTION OF THE DRAWINGS

A preferred embodiment of the invention will now be described in detail with reference to the accompanying drawings, in which.

DETAILED DESCRIPTION OF A PREFERRED EMBODIMENT

Figure 1:
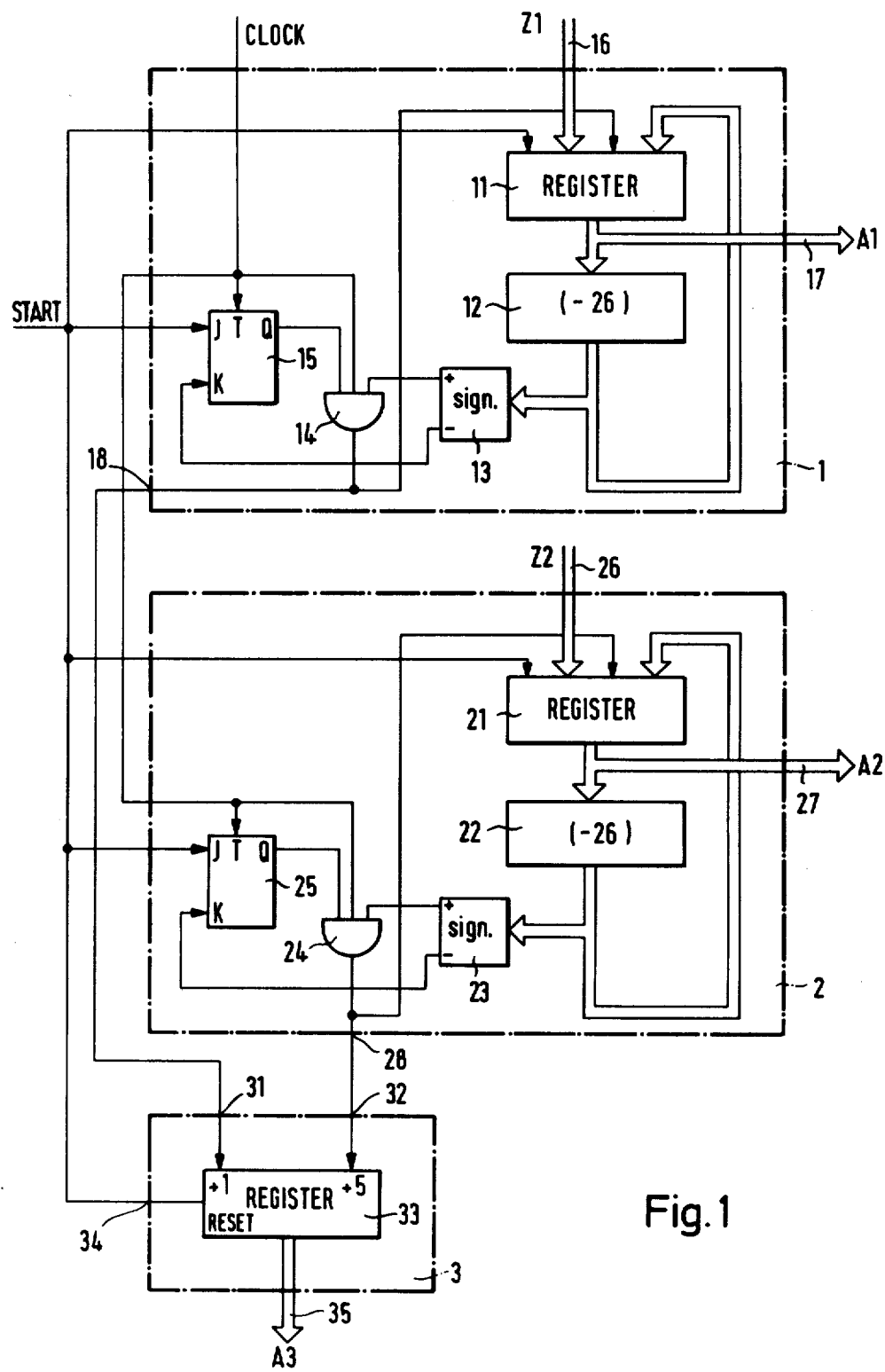
FIGS. 1 and 2 are a block circuit diagram of the conversion and reconversion part of a cryptogram converter according to the invention.

The conversion part of a cryptogram converter shown in FIG. 1 converts each pair of ASCII characters (0 ... 127) into three letter characters (0 ... 25) and substantially comprises three circuits 1, 2 and 3. The first two circuits 1 and 2 are identical and each comprise a register 11, 21 respectively, a subtracting stage 12, 22, a sign detector 13, 23, an AND gate 14, 24 and a JK flip-flop 15, 25. In addition, the two circuits each have a data input 16, 26, a data output 17, 27, an output 18, 28 leading to inputs 31, 32 and inputs (not shown in detail) for a common timing signal and a starting signal. The third circuit 3 only comprises an adding register 33 with the aforementioned inputs 31 and 32, a reset input 34 and a data output 35.

Each pair of ASCII characters Z1 and Z2 is converted into the corresponding set of three letters A1, A2, and A3 as follows: The two characters Z1, Z2 are interpreted as figures and each divided by 26. Next, the highest integral multiples $Q_1$, $Q_2$ of 26 in Z1 and Z2 are multiplied by 1 and 5 respectively and the products are added. The remainders after division give the first two letters $A_1$, $A_2$, and the sum of the products gives the third character A3. This can be formally expressed as follows:

$$Z1 = Q_1 \times 26 + A1$$

$$Z2 = Q_2 \times 26 + A2$$

$$A3 = Q_2 \times 5 + Q_1$$

As can easily be seen, the multiples $Q_1$ and $Q_2$ cannot be greater than 4.

Reconversion is similar. First $Q_2$, i.e. the highest integral multiple of 5 in A3, is obtained by division and $Q_1$ is obtained as the remainder. Next, $Q_1$ and $Q_2$ are each multiplied by 26 and added to A1 or A2, thus obtaining the sums Z1 and Z2.

The aforementioned converter operates as follows: In response to a given starting pulse, registers 11 and 21 are fed with the two characters Z1 and Z2 of the ASCII alphabet, the adding register 33 is switched off and flip-flops 15 and 25 are set. At each timing pulse, the differences between the number 26 and the contents of registers 11 and 21 are obtained in the subtracting stages 12 and 22, the signs of the differences are checked in the sign detectors 13 and 23 and, as long as the signs are positive, the differences are fed to registers 11, 21 in place of the original contents. Each time a timing pulse via AND gates 14 and 24 reaches the control inputs 31,32 of adding register 33, its contents are increased by 1 or 5, or by 6 if the timing pulses reach both inputs simultaneously.

As soon as the sign of the differences is negative in one or both circuits 1 and 2, the sign detector 13 or 23 resets the corresponding flip-flop 15 or 25 and thus blocks the AND gate 14 or 24, so that no further timing pulses can reach the corresponding input of the adding register 33 or the corresponding register 11 or 21. This prevents the difference, which is now negative, from being fed to the corresponding register.

Thus, the number of timing pulses delivered to the adding register 33 via AND gates 14 and 24 correspond to the highest integral multiples $Q_1$, $Q_2$ of 26 in Z1, Z2 respectively, and the final contents of registers 11 and 21 are the remainders, i.e. two of the three new characters A1–A3. The third character A3 is given by the final contents of the adding register.

In the present example the integral multiple of 26 is obtained by a cyclically operating subtracting circuit. Of course, a true dividing circuit could also be used, but continuous subtraction results in a more convenient circuit.

Figure 2:
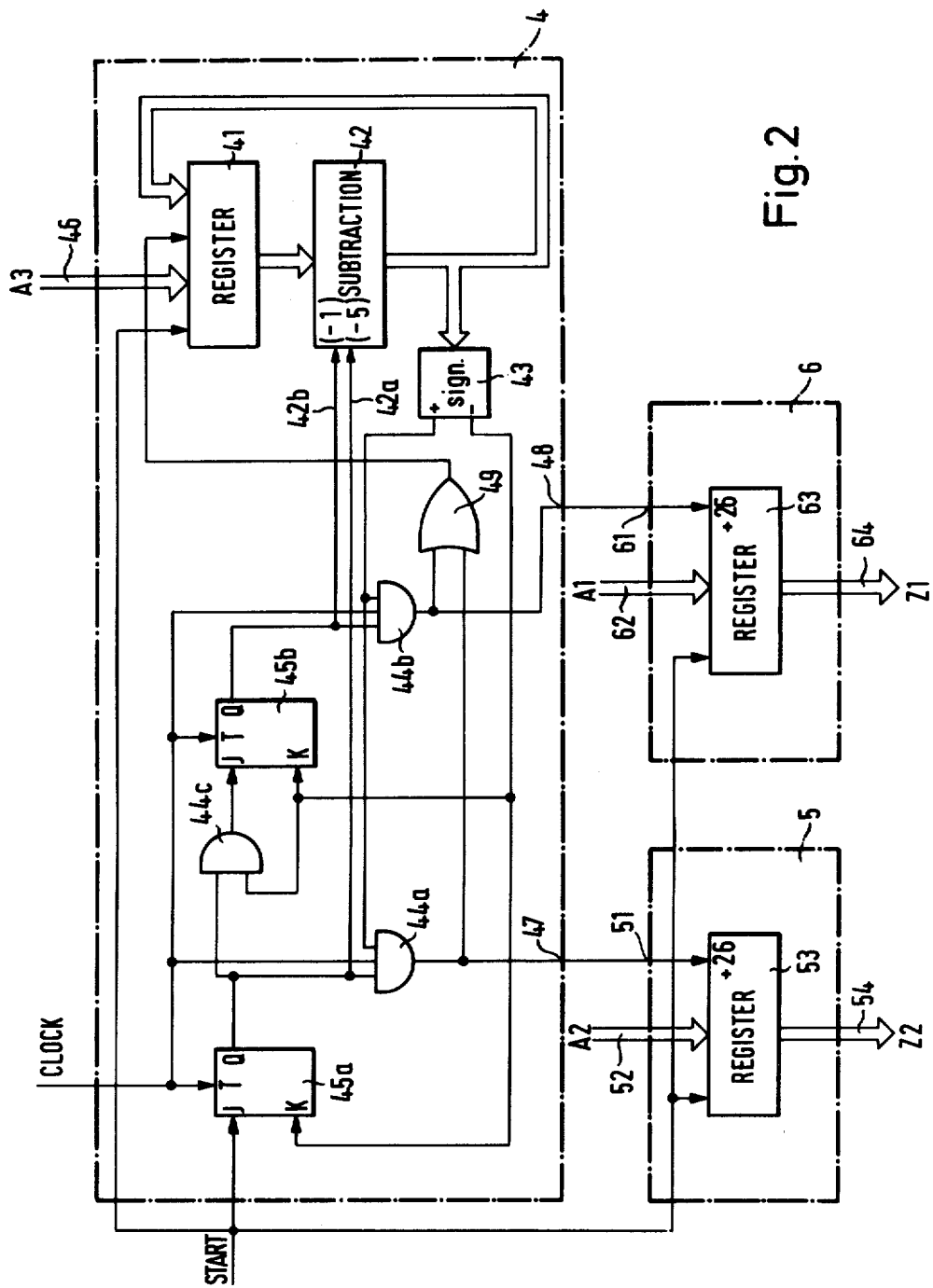

FIG. 2 shows the reconversion part of the cryptogram converter, which reconverts each three letters, A1, A2 and A3 into two ASCII characters Z1, Z2, and, as before, substantially comprises three circuits 4, 5 and 6. Circuit 4 contains a register 41, a subtracting stage 42 adjustable via two inputs 42a, 42b, so that it subtracts 5 or 1 respectively, a sign detector 43, three AND gates 44a, 44b and 44c, two flip-flops 45a and 45b and an OR gate 49. Circuit 4 also has a data input 46 and two control outputs 47 and 48 leading to control inputs 51, 61 respectively of circuits 5 and 6. There is also a timing input (not shown) and a starting input. Circuits 5 and 6 are identical and respectively comprise an adding register 53, 63, a data input 52, 62, a data output 54, 64 and setting inputs (not shown).

The reconversion of A1, A2, A3 to Z1 and Z2 is started by a suitably generated starting pulse, as a result of which registers 53 and 63 are fed with the two letter values A2, A1 via the data inputs 52, 62, flip-flop 45a is set and consequently the subtracting stage 42 is switched to subtraction of 5 and the letter value A3 is fed to register 41. Each time a timing pulse reaches register 41 via AND gate 44a and OR gate 49, the subtraction stage 42 forms the difference between the number 5 and the instantaneous contents of register 41, the sign of the difference is checked by the sign detector 43 and, if positive, the difference is fed to register 41 in place of the original contents. Simultaneously, a timing pulse is delivered via AND gate 44a to input 51 of adding register 53, thus increasing its contents by 26 each time.

As soon as the sign of the difference formed in stage 42 becomes negative, the sign detector 43 resets the flip-flop 45a and simultaneously sets flip-flop 45b via AND gate 44c. As a result, the subtraction stage 42 is switched over to subtracting 1, the AND-gate 44b is opened. At each new timing pulse, the contents of register 41 is similarly reduced by 1.

The contents of the adding register 63 is increased each time by 26. When the difference is negative, the sign detector 43 resets flip-flop 45a and thus ends the conversion. The number of timing pulses supplied to registers 53 and 63 is equal to the highest multiple of the number 5 or the remainder in A3, and thus, as previously shown, is equal to $Q_2$ or $Q_1$. The final contents of registers 53 and 63 are therefore the reconverted characters Z1 or Z2 of the ASCII alphabet.

During reconversion, of course, the integral multiples $Q_1$ and $Q_2$ can as before be obtained by direct division instead of repeated subtraction. The circuitry of the cryptogram converter is of subordinate importance; the main feature is that, in each case, two characters of the more extensive set are converted into three characters of the more limited set. Accordingly, the cryptogram converted according to the invention can be very elegantly and advantageously embodied by means of a process computer or micro-computer.

Figure 3:
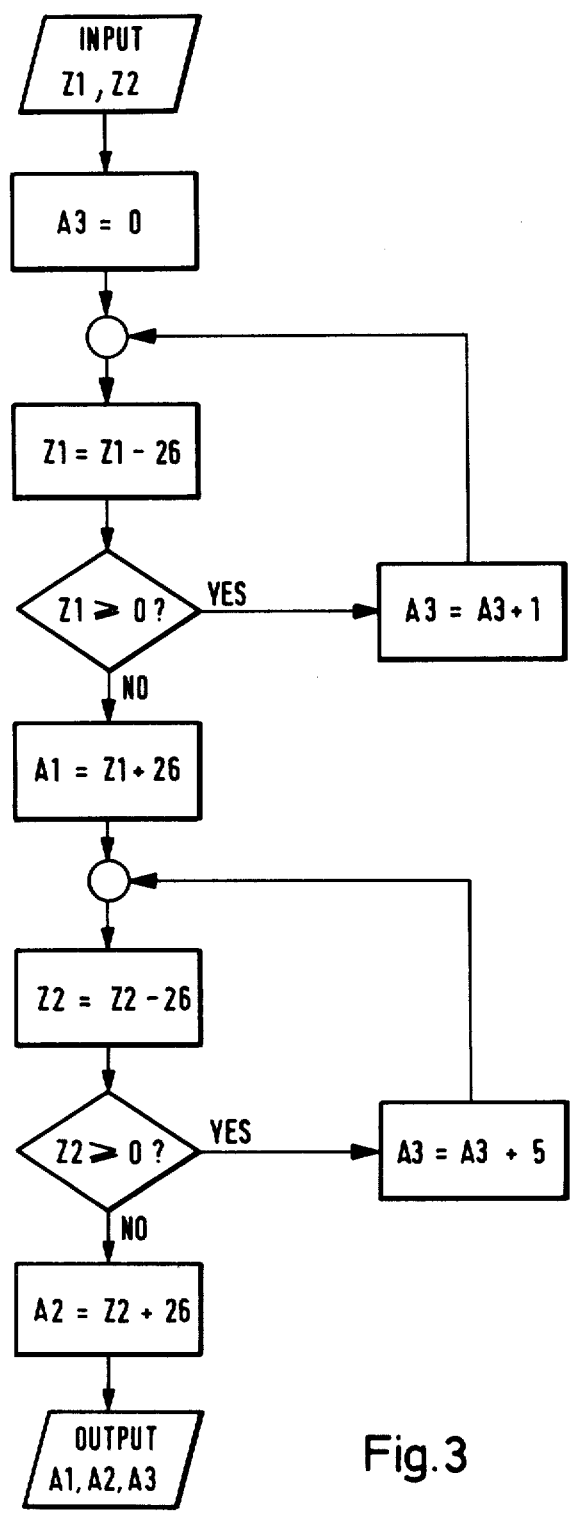
FIGS. 3 and 4 are flow diagrams showing conversion and reconversion by a cryptogram converter according to the invention, embodied by a process computer.
Figure 4:
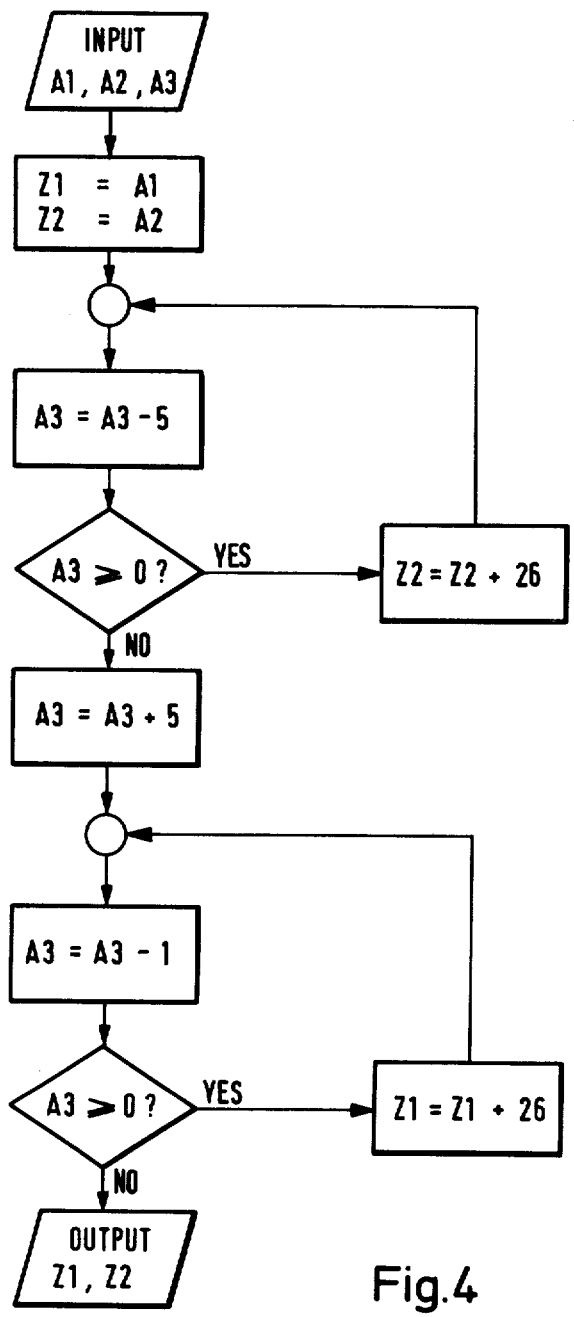

FIGS. 3 and 4 are flow diagrams for conversion and reconversion, by means of which any micro-computer (e.g. Intel system 8080) can without difficulty be programmed so as to operate as a cryptogram converter according to the invention.

We claim:

1. A crypto-converter for unambiguously converting characters of a first 128-character alphabet into characters of a second 26-character alphabet and vice-versa, comprising a conversion stage and a reconversion stage; the conversion stage including input means for a pair of characters of said first alphabet, means converting said pair of characters into three characters of said second alphabet and output means for said three characters; and the reconversion stage including input means for a triple of characters of said second alphabet, means reconverting said triple of characters into a pair of characters of said first alphabet and output means for said pair of characters.

2. A converter according to claim 1, wherein said converting means comprise first, second and third circuits, the first and second circuits each having a binary coded input for a first and second character respectively of the first alphabet, a binary coded output for a first and second character of the second alphabet, and an additional output connected to a respective input of the third circuit, the first and the second circuit from the largest integral multiple of 26 from the binary coded characters supplied to their inputs, convey the multiple to the third circuit and deliver the resulting remainders—i.e. the first or second character of the second alphabet—at their corresponding output, and the third circuit multiplies the multiple from the second circuit by 5, adds it to the multiple from the first circuit and delivers the sum—i.e. the third character of the second alphabet—to a binary coded output.

3. A converter according to claim 2, including reconversion means for unambiguously converting characters from the second 26 character alphabet into characters of the first 128-character alphabet, the reconversion means comprising a fourth, fifth and sixth circuit, the fourth circuit having a binary coded input for each third character of the second alphabet and two outputs each connected to an input of the fifth and sixth circuit, and the fifth and sixth circuit each have an additional binary coded input for the first or second character respectively of the second alphabet and each have a binary coded output for the first alphabet, the fourth circuit forms the largest integral multiple of five from each third character of the second alphabet supplied to its input and supplies the multiple to the fifth circuit and the remainder to the sixth circuit, and the fifth and sixth circuit add a multiple of 25 corresponding to the remainder of the aforementioned largest multiple to each first or second character respectively of the second alphabet supplied to each of their inputs, and output the sum, i.e. the first or second character of the first alphabet.

4. A converter according to claim 2, wherein the first and second circuit repeatedly subtract the number 26 to form the largest integral multiple of 26.

5. A converter according to claim 3, wherein the fourth circuit repeatedly subtracts 5 to form the largest integral multiple of 5.

6. A converter according to claim 4, wherein the first and the second circuit each comprise a store for the first and second character respectively of the first alphabet, means for obtaining the difference between the store contents and 26, means for checking the sign of the difference and generating a signal if the sign is positive, and means which, if the sign is positive, are actuated by the checking means so as to reduce the store contents by 26.

7. A converter according to claim 5, wherein the fourth circuit comprises a store for each third character of the second alphabet, switchable means for obtaining the differences between the store contents and 5 or 1 respectively, means for checking the sign of the difference and generating a first or second signal if the sign is positive, means which, if the sign is positive, and actuated by the checking means so as to reduce the store contents by 5 or 1, and means which, if the sign is negative, are actuated by the sign-checking means so as to switch over the difference-forming means so that it subtracts 5 instead of 1.

8. A converter according to claim 6 wherein the six circuits are embodied by a suitably programmed process computer.

9. A converter according to claim 7 wherein the six circuits are embodied by a suitably programmed process computer.

10. A crypto-converter for unambiguously converting characters of a first multi-character alphabet into characters of a second multi-character alphabet, the first alphabet containing a first number of characters and the second alphabet containing a second number of characters wherein said first number exceeds said second number, the crypto-converter system comprising:
   input circuit means for supplying multiple bit digital signals each representing a character of the first alphabet;
   means interpreting said digital signals as numerical figures for converting a pair of said characters of said first alphabet into three characters of said second alphabet in response to said second number of characters in said second alphabet; and
   output circuit means for supplying multiple bit digital output signals each representing a character of said second alphabet, wherein three characters of said second alphabet represent two characters of said first alphabet in a reversible manner related to said number of characters in said second alphabet.

11. The crypto-converter of claim 10 including a reconverter for unambiguously converting characters of said second alphabet into characters of said first alphabet, said reconverter comprising:
   second input circuit means for supplying second multiple bit digital input signals each representing a character of said second alphabet;
   second means interpreting said digital signals as numerical figures for converting three of said characters of said second alphabet into two characters of said first alphabet in response to said second number of characters in said second alphabet; and,
   second ouput circuit means for supplying multiple bit digital output signals each representing a character of said first alphabet, wherein two characters of said first alphabet are produced in response to three characters of said second alphabet in a reversible manner related to said number of characters in said second alphabet.

12. A crypto-converter system for unambiguously converting characters of a first multi-character alphabet into characters of a second multi-character alphabet, the first alphabet containing a first number of characters and the second alphabet containing a second number of characters wherein said first number exceeds said second number and is other than an integral multiple of said second number, the cryto-converter system comprising:
   (a) input circuit means for supplying first and second digital signals representing, respectively, first and second characters ($Z_1$, $Z_2$) of the first multicharacter alphabet;
   (b) program controlled processor means connected to said input circuit means, the processor means interpreting said digital signals as one of a plurality of numerical figures equal in number to said first number and performing the following functions:
      (1) calculating the highest integral multiple ($Q_1$, $Q_2$) of said second number, and the remainder, contained in each of the numerical figures represented by the first and second digital signals, the remainders forming first and second characters ($A_1$, $A_2$), respectively, of the second multicharacter alphabet;
      (2) multiplying the highest integral multiple of one of the first and second characters ($Q_1$) by a first predetermined integer and summing this product with the product of the highest integral multiple of the other of the first and second characters ($Q_2$) and a second predetermined integer, the sum of the products forming a third character ($A_3$) of the second multi-character alphabet; and,
      (3) supplying as output signals, third, fourth and fifth digital signals representing, respectively, said first, second and third characters ($A_1$, $A_2$, $A_3$) of said second multi-character alphabet, the third, fourth and fifth digital signals thereby representing in the second multi-character alphabet an unambiguous, encrypted version of the first and second characters of the first multi-character alphabet.

13. A crypto-converter system for unambiguously converting characters of a first 128-character alphabet into characters of a second 26-character alphabet, the crypto-converter system comprising:
   (a) input circuit means for supplying first and second digital signals representing, respectively, first and second characters of the 128-character alphabet;
   (b) program controlled processor means connected to said input circuit means, the processor means interpreting said digital signals as one of 128 numerical figures and performing the following functions:
      (1) calculating the highest integral multiple of 26, and the remainder, contained in each of the numerical figures represented by the first and second digital signals, the remainders forming first and second characters, respectively, of the 26-character alphabet;
(2) multiplying the highest integral multiple of one of the first and second characters by 5 and summing this product with the highest integral multiple of the other of the first and second characters, the sum forming a third character of the 26-character alphabet; and,
(3) supplying as output signals third, fourth and fifth digital signals representing, respectively, said first, second and third characters of said 26-character alphabet, the third, fourth and fifth digital signals thereby representing in the 26-character alphabet an unambiguous, encrypted version of the first and second characters of the 128-character alphabet.

14. A converter system according to claim 13, including a reconverter for unambiguously converting characters from the second 26-character alphabet into characters of the first 128-character alphabet, the reconverter comprising:
(a) second input circuit means for supplying said third, fourth and fifth digital signals representing, respectively, said first, second and third characters of said second 26-character alphabet;
(b) second program controlled processor means connected to said second input circuit means, said second processor means interpreting said third, fourth and fifth digital signals as numerical figures and performing the following functions:
(1) calculating the highest integral multiple of 5, and the remainder, contained in the numerical figure represented by the sixth digital signal, said highest integral multiple of 5 representing said highest multiple of 26 in said one of said first and second digital signals and the remainder representing the highest integral multiple of 26 in said other of said first and second digital signals;
(2) multiplying said highest integral multiple of 5 by 26 and adding to the product the numerical figure represented by said fourth digital signal, the resultant sum forming said one of said first and second digital signals;
(3) multiplying said remainder by 26 and adding to the product the numerical figure represented by said third digital signal, the resultant sum forming said other of said first and second digital signals; and,
(4) supplying as output signals said first and second resultant sums as said one and said other of the first and second digital signals, respectively.

* * * * *